(12) United States Patent
Black et al.

(10) Patent No.: US 9,041,246 B2
(45) Date of Patent: May 26, 2015

(54) SYSTEM AND METHOD FOR PHASE BALANCING IN A POWER DISTRIBUTION SYSTEM

(75) Inventors: Jason Wayne Black, Clifton Park, NY (US); Kannan Natarajan Tinnium, Clifton Park, NY (US); Ronald Ray Larson, Palm Bay, FL (US); Xiaofeng Wang, Melbourne, FL (US); Harjeet Johal, Glenville, NY (US)

(73) Assignee: General Electric Company, Niskayuna, NY (US)

( * ) Notice: Subject to any disclaimer, the term of this patent is extended or adjusted under 35 U.S.C. 154(b) by 1193 days.

(21) Appl. No.: 12/893,864

(22) Filed: Sep. 29, 2010

(65) Prior Publication Data

US 2012/0074779 A1 Mar. 29, 2012

(51) Int. Cl.
*H02J 3/26* (2006.01)
*H02J 1/10* (2006.01)
*H02J 3/00* (2006.01)

(52) U.S. Cl.
CPC ... *H02J 3/26* (2013.01); *Y02E 40/50* (2013.01)

(58) Field of Classification Search
CPC .................................. H02J 3/26; Y02E 40/50
USPC ................. 307/11, 14, 28; 700/291, 295, 298
See application file for complete search history.

(56) References Cited

U.S. PATENT DOCUMENTS

| | | | |
|---|---|---|---|
| 4,689,735 A * | 8/1987 | Young | 363/155 |
| 5,672,957 A * | 9/1997 | Bergmann | 323/210 |
| 6,486,569 B2 | 11/2002 | Couture | |
| 8,143,747 B2 * | 3/2012 | Walton | 307/105 |
| 2004/0100247 A1 * | 5/2004 | Matsumoto et al. | 324/86 |
| 2004/0225649 A1 * | 11/2004 | Yeo et al. | 707/3 |
| 2009/0051220 A1 | 2/2009 | Cleveland | |
| 2009/0187284 A1 * | 7/2009 | Kreiss et al. | 700/291 |
| 2010/0114400 A1 * | 5/2010 | Feng et al. | 700/298 |
| 2010/0138065 A1 * | 6/2010 | Taft | 700/295 |

OTHER PUBLICATIONS

Pothamsetty et al., "Smart Grid: Leveraging Intelligent Communications to Transform the Power Infrastructure", Cisco Website, Downloaded from Internet:<http://www.cisco.com/web/about/citizenship/environment/docs/sGrid_wp_c11-532328.pdf>, 11 pages, Feb. 2009.

* cited by examiner

*Primary Examiner* — Rexford Barnie
*Assistant Examiner* — Rasem Mourad
(74) *Attorney, Agent, or Firm* — Nitin N. Joshi (57) ABSTRACT

A phase balancing system includes a load forecasting module, a phase unbalance identification module and a demand response module. The load forecasting module determines a load forecast for the distribution system for the period of interest and the phase unbalance identification module determines voltage unbalance on the distribution system for the period of interest. The demand response module estimates an available demand response on the distribution system for the period of interest and allocates an optimized demand response from the available demand response to minimize the voltage unbalance on the distribution system for the period of interest.

25 Claims, 5 Drawing Sheets

SYSTEM AND METHOD FOR PHASE BALANCING IN A POWER DISTRIBUTION SYSTEM

BACKGROUND

In a balanced three-phase power system, the individual phase quantities (voltages/currents) are equal in magnitude and are displaced with respect to each other by 120°. Generally, transmission systems are balanced, but distribution power systems, are highly unbalanced. Some of the sources of imbalances include asymmetrical winding impedances of distribution transformers and asymmetrical line impedances. The main source of voltage imbalance at distribution points is the uneven distribution of single phase loads. Another source of imbalance is a fault or other interruption (e.g. for maintenance) along a single phase line. This would create a need for short term balancing until the affected line can be brought back into service. Further, the energy consumption by these loads changes continuously, making the balancing process challenging.

Effects of phase imbalances include increased line losses and heating, equipment overloading, and decreased system stability. Unbalanced phase currents create neutral current flows (if neutral path exists) leading to additional losses (neutral line losses) on the system. Unbalanced voltages are an issue for three phase loads like induction motors or power-electronic converters, as the negative and zero sequence currents create additional losses. Unbalanced currents also lead to torque pulsations, increased vibrations and mechanical stresses, increased losses, and motor overheating and thus degrades the performance and shortens the life of the induction motors. In power electronic converters, the effects of unbalanced voltages include increased input current distortion, generation of twice the fundamental frequency voltage ripple in the DC link and an increased reactive power.

There is currently a very limited ability to alleviate phase imbalances on distribution systems. Manual feeder switching operations to transfer circuits with multiple customers or loads from one phase to another phase at the substation level is one way of balancing an electricity distribution system. Several algorithms have been developed to optimize feeder switch positions. However, the switching is performed in a discrete manner and it cannot dynamically balance the system load. Another way to balance the electricity distribution system is to utilize passive power filters that balance the load impedances. The load currents in this case are balanced by adding reactive elements in parallel to the loads. An alternative way of balancing currents is to use a shunt connected thyristor controlled static VAR compensator, where again the load current is balanced by adding reactive elements in parallel to the load. These are costly solutions, however, since they require additional capital investments to add equipment to the system. Further, they are not dynamic and may also inject harmonics into the system.

For these and other reasons, there is a need for embodiments of the present invention.

BRIEF DESCRIPTION

In accordance with an embodiment of the present invention, a phase balancing system for a distribution system is provided. The system includes a load forecasting module to determine a load forecast for the distribution system for a period of interest. The system also includes a phase unbalance identification module to determine voltage unbalance on the distribution system for the period of interest and a demand response module to estimate an available demand response on the distribution system for the period of interest. The demand response module is further configured to allocate an optimized demand response from the available demand response to minimize the voltage unbalance on the distribution system for the period of interest.

In accordance with another embodiment of the present invention, a method for phase balancing in a distribution system is provided. The method includes determining a load forecast for the distribution system for a period of interest and determining a voltage unbalance on the distribution system for the period of interest. The method also includes estimating an available demand response on the distribution system for the period of interest and allocating an optimized demand response from available demand response to minimize the voltage unbalance on the distribution system.

In accordance with yet another embodiment of the present invention, computer-readable medium comprising computer-readable instructions of a computer program that, when executed by a processor, cause the processor to perform a method for phase balancing in a distribution system is provided. The method includes determining a load forecast for the distribution system for a period of interest and determining a voltage unbalance on the distribution system for the period of interest. The method also includes estimating an available demand response on the distribution system for the period of interest and allocating an optimized demand response from available demand response to minimize the voltage unbalance on the distribution system.

DRAWINGS

These and other features and aspects of embodiments of the present invention will become better understood when the following detailed description is read with reference to the accompanying drawings in which like characters represent like parts throughout the drawings, wherein.

DETAILED DESCRIPTION

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As used herein, the term "module" refers to software, hardware, or firmware, or any combination of these, or any system, process, or functionality that performs or facilitates the processes described herein.

Figure 1:
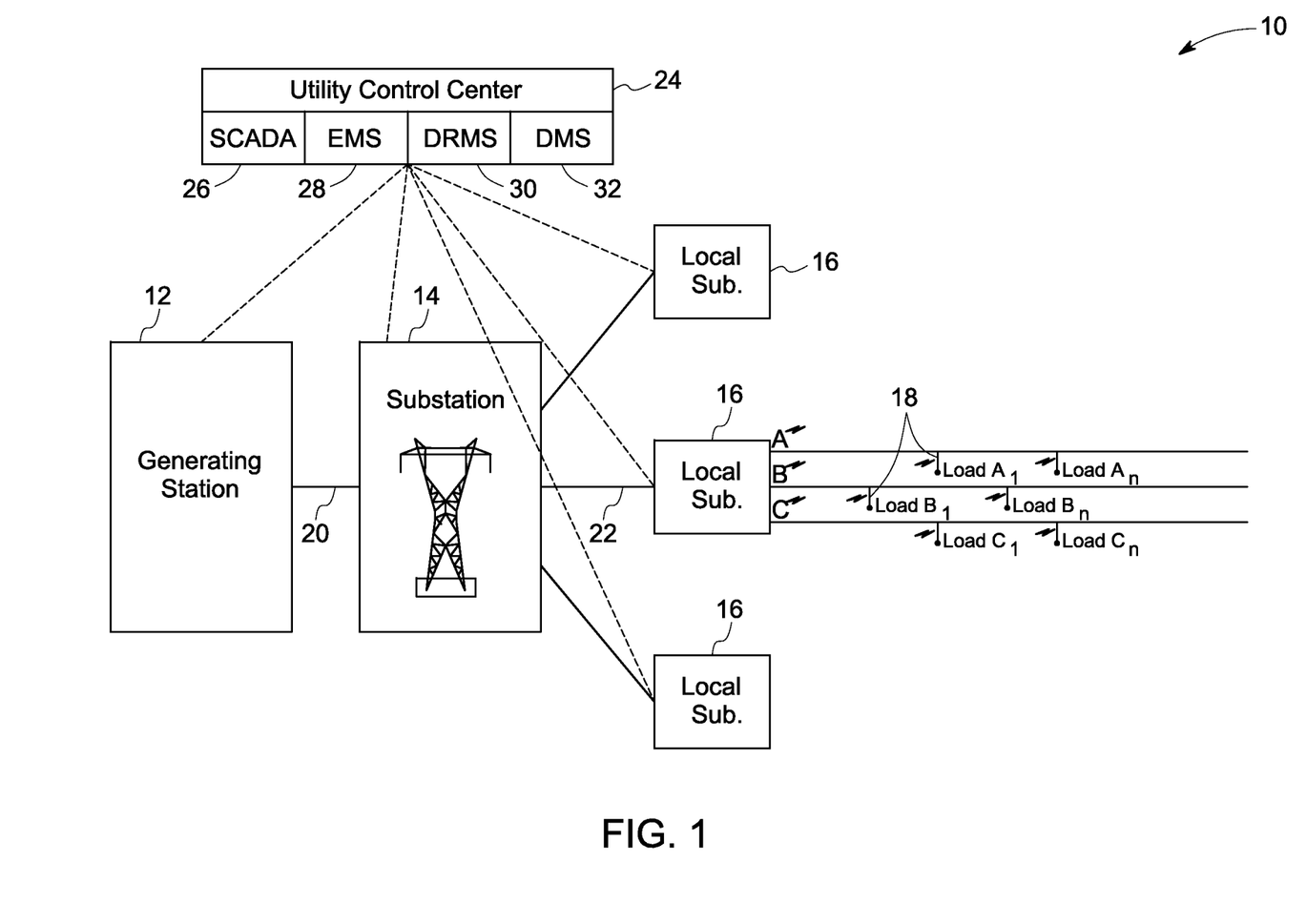
FIG. 1 is a diagrammatical representation of an overall electric system.

FIG. 1 illustrates a single line diagram of an overall electric system 10 from generation to utilization. The electric system 10 includes a generating station 12, a transmission substation 14, local substations or distribution substations 16 and loads 18. Generating station 12 may be a hydropower generating station, a thermal power generating station, a wind power generating station or a solar power generating station, for example. Generating station 12 generates electricity at a generating station voltage which is in the range of 4 to 13 kV. The generating station voltage is stepped up to a higher transmission level voltage such as 110 kV and above by a generating station transformer (not shown) since the electricity can be transferred more efficiently at high voltages.

The electricity at transmission level voltage is transmitted to transmission substation 14 by extra high voltage (EHV) transmission lines 20. EHV transmission lines 20 carry electricity long distances to a substation. At transmission substation 14, a reduction in voltage occurs for distribution to other points in the system through high voltage (HV) transmission lines 22. Further voltage reductions for commercial and industrial or residential loads 18 take place at distribution substation 16. The distribution substation 16 may supply electricity at voltages in the range of 4 to 69 kV. The voltages are further reduced at one or two more levels to supply the electricity to residential loads at lower voltages such as 120 or 240 V.

A utility control center 24 is used in the system 10 for operation and maintenance of generating station 12, transmission substation 14 and distribution substation 16. Utility control center 24 receives data from each of these components and also provides control signals to these components. It should also be noted here that the loads 18 communicate with their respective local substations 16 and thus, the utility control center 24 also receives and transmits information to and from the loads 18. In one embodiment, smart meters (not shown) facilitate communication between loads 18 and local substations 16. The communication modes between these various components can include fiber optics, power line carrier systems, and various wireless technologies. Components of the utility control center 24 include a supervisory control and data acquisition (SCADA) system 26, an energy management system (EMS) 28, a demand response management system (DRMS) 30, and a distribution management system (DMS) 32. In one embodiment, some of these components may be provided separately in system 10 rather than in the utility control center 24. For ease of discussion, only one utility control center 24 is shown, however, there can be any number of utility control centers as needed for performance.

As will be appreciated by those skilled in the art, SCADA usually refers to basic control and monitoring of field devices including breakers, switches, capacitors, reclosers, and transformers. The SCADA system includes data collection computers at the control center 24 and remote terminal units (RTUs) in the field that can collectively monitor and control anywhere from hundreds to tens of thousands of data points. It also includes a user interface that is typically monitored around the clock. The user interface, in addition to one or more computer displays, usually includes a mapboard or large group displays to provide an overview of system status.

EMS 28 coordinates and optimizes power generation and transmission. EMS 28 includes applications such as automatic generation control (AGC), load forecasting, engineering load flow, economic dispatch, energy accounting, interchange transactions, reserve calculations (spin and non-spin), and VAR/voltage control. DRMS 30 controls peak demand and produces other economies without major inconvenience to the customer. In some embodiments, DRMS 30 is added as a function of the EMS 28 because of its use in controlling overall peak demand and generation requirements. In another embodiment, DRMS 30 is located at a utility control center located near distribution substation. Further DMS 32 includes functions and capabilities that would improve the reliability and efficiency of the power distribution system.

Figure 2:
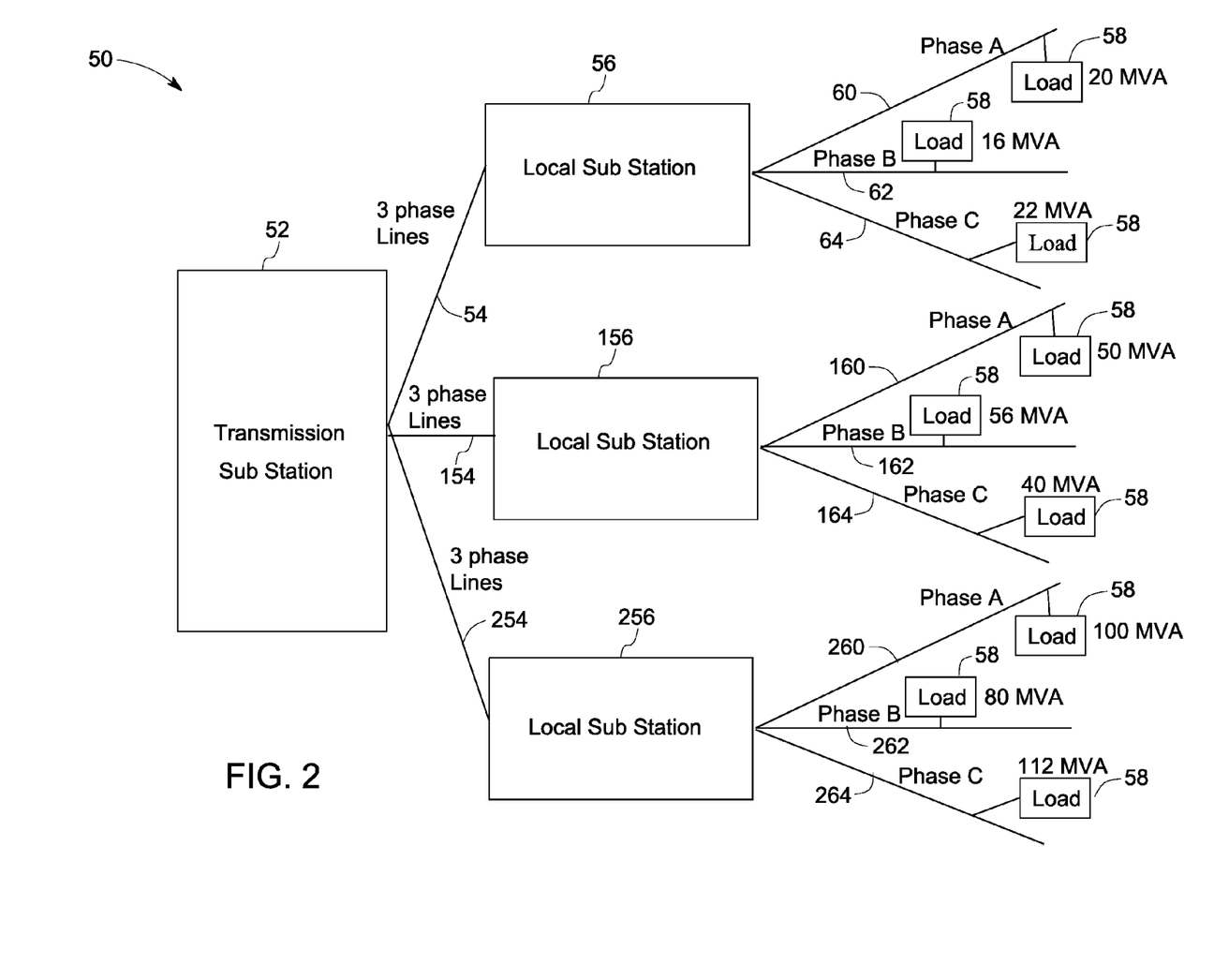
FIG. 2 is a diagrammatical representation of an unbalanced power distribution system.

FIG. 2 shows an unbalanced power distribution system 50. As in FIG. 1, power distribution system 50 includes a transmission substation 52 supplying power to local substations 56, 156, 256 through distribution lines 54, 154, and 254. Local substations 56, 156, 256 then supply power to loads 58 through phase feeder lines, 60, 160, 260 for phase A feeder lines, 62, 162, 262 for phase B feeder lines, and 64, 164, 264 for phase C feeder lines respectively. It can be seen from the figure that the load distribution on each of the local substations 56, 156, and 256 is unbalanced. For example, substation 56 has 20 MVA of load on phase A, 16 MVA of load on phase B and 22 MVA of load on phase C. Similarly load distribution on local substations 156 and 256 is unbalanced. Further, the time varying nature of the loads compounds to the problem of phase unbalance. As a result of unbalanced load distribution on local substations 56, 156 and 256, the load distribution on transmission substation 52 is also unbalanced. The total phase A load on transmission substation 52 includes all the phase A loads on local substations 56, 156, 256. Similarly, total phase B and phase C loads on transmission substation 52 are the sum of respective phase loads on local substations 56, 156, 256. Thus, transmission substation 52 has 170 MVA load on phase A, 152 MVA load on phase B and 174 MVA load on phase C which is unbalanced load distribution on transmission substation 52. However, if the transmission substation is large, then the geographical diversity may balance out the load distribution on individual phases. In contrast, the distribution substations 56, 156, and 256 would always see an unbalanced load distribution.

Unbalanced load distribution on three phase lines causes unbalanced currents in those lines and thus unbalanced voltage drop across those lines. For example, assuming a DC circuit for simple calculations and assuming impedance of each of the phase feeder lines 60, 62 and 64 to be equal to 2 ohms, for the local substation voltage of 20 kV on all three phases, each of the phase loads will see a different voltage. Phase A load will observe voltage of 11.84 kV, phase B load will observe voltage of 11.68 kV and phase C load will observe voltage of 11.92 kV. For an AC circuit, the calculations will be complex because of phasor terms. It should also be noted here that the voltages calculated above are phase to neutral voltages and phase to phase voltages will vary depending on star or delta connection. It can be seen from the above calculations that the three phase voltages are unbalanced when the three phase loads are unbalanced. The unbalanced loads also cause a certain amount of current to flow through the neutral wire and results in increased line losses. If the loads were to be balanced i.e., 20 MVA in each phase then the voltages would also be balanced and no losses would occur in the neutral wire.

The voltage unbalance (VU) in percent as defined by the National Electrical Manufacturers Association (NEMA) is given as:

$$\% \text{VU} = 100 * (\text{max deviation from average voltage}) / \text{average voltage} \quad (1)$$

where average voltage is the average voltage of all three voltages. It should be noted here that the line voltages are used in this NEMA standard as opposed to the phase voltages. When phase voltages are used, the phase angle unbalance is not reflected in the % Unbalance and therefore phase voltages are seldom used to calculate voltage unbalance. For example, with line voltage readings of 230 kV, 232 kV, and 225 kV, the average is 229 kV. The maximum deviation from the average among the three readings is 4 kV. The percent imbalance is 100*4/229=1.7%.

Another method used in European standards to indicate the degree of unbalance is the voltage unbalance factor (VUF) which is the ratio of the negative sequence voltage to the positive sequence voltage represented as:

$$\% \text{VUF} = (V2/V1)*100 \qquad (2)$$

where V1 and V2 are the positive and negative sequence voltages, respectively. Thus, if there is no negative sequence voltage in the system voltages then it means the system voltages are balanced.

Figure 3:
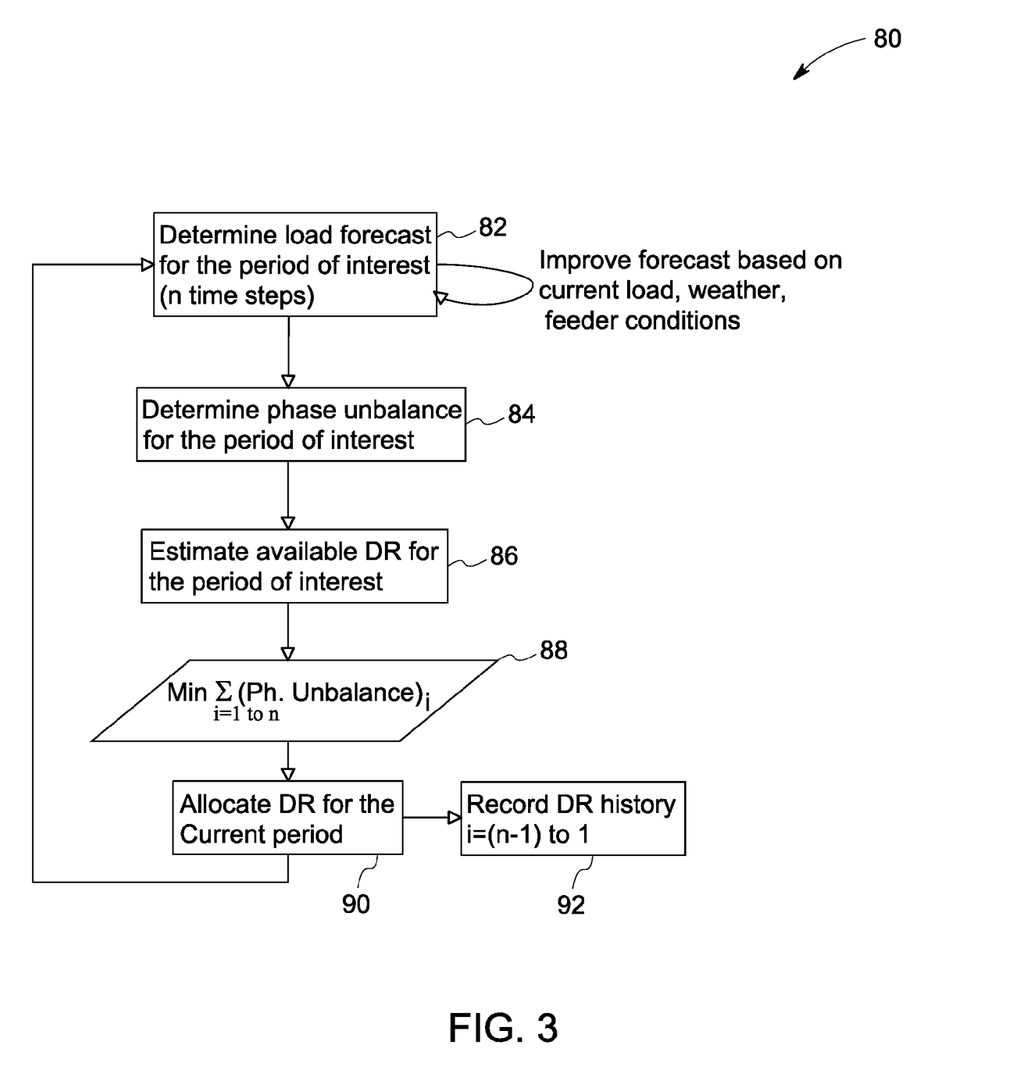
FIG. 3 is a flow chart representing a method of balancing the three phase voltages in accordance with an embodiment of the present invention.

FIG. 3 shows a method 80 of balancing the three phase voltages in accordance with an embodiment of the present invention. As described earlier, if the loads are balanced in all three phases then the balanced line voltages can be achieved. Thus, the method 80 provides steps to balance the load in the distribution system. In step 82, a load forecast for the distribution system is determined for a period of interest. The load forecast is determined in terms of MVA loadings which indicates active as well as reactive loadings. In one embodiment, the period of interest may be an hour, a day or a week or any other suitable time determined by the user or the operator. In another embodiment, the load forecast is determined for n time steps into the future, where n is again a number determined by the operator.

Load forecasting is important in determining how much load each phase can have at any given time of the period of interest. Accordingly, load forecast helps in planning the load balancing steps. Load forecasting techniques utilize various factors such as time, weather conditions, customer types, distribution system conditions, and historical load and weather data to provide a load forecast. The time factor includes time of the year, the day of the week, and the hour of the day. For example, there are important differences in load between weekdays and weekends. Weather factors include temperature and humidity. In fact, the temperature humidity index (THI) and the wind chill index (WCI) are two important factors in determining load forecast. THI is a measure of summer heat discomfort and similarly WCI is cold stress in winter. Similarly, customer types help in determining load forecast by identifying different classes of loads for residential, commercial, and industrial consumers. As will be appreciated by those skilled in the art, load forecasting methods may include similar day approach, various regression models, time series, neural networks, expert systems, fuzzy logic, and statistical learning algorithms. The distribution system conditions include the topology of the network, location of customers along the network, and information on control devices such as voltage regulators, capacitor banks, etc. This information is useful in running a load flow on the distribution system to estimate the state in terms of voltages at different points.

Once the load forecast is determined for each time step, a load flow algorithm is applied on the forecasted data in step 84. The load flow algorithm obtains complete voltage angle and magnitude information for each bus or each node on the distribution system for a forecasted active and reactive loads. Since determining voltage information based on active and reactive load information is a nonlinear problem, numerical methods are employed to obtain a solution that is within an acceptable tolerance. Numerical methods for the distribution load flow algorithm may include William Kersting's backward/forward sweep algorithm. Once the voltages are determined, equation (1) or (2) described above may be utilized to identify voltage unbalance or phase unbalance during each time step for the period of interest.

In step 86, the demand response (DR) resource/events available for each time step of the period of interest is estimated. Demand response refers to mechanisms used to encourage/induce utility consumers to curtail or shift their individual demand in order to reduce aggregate utility demand during particular time periods. For example, in the present embodiment, electric utilities employ demand response programs to balance the loads and hence the voltages on all three phases. Demand response programs typically offer customers incentives for agreeing to reduce their demand during certain time periods.

Demand response programs such as critical peak pricing (CPP), Variable Peak Pricing (VPP), Direct Load Control (DLC), and other various incentive programs are examples of programs wherein a utility specifies contractual obligations on when, how often, and the duration of a demand response event for a participating customer. For example, a contract may specify that the utility can invoke up to 15 events per year, where each event will occur between the hours of 12 pm and 6 pm with a maximum of 60 total hours per year. According to embodiments of the invention, the utility can choose to use 10 events of 6 hours each, or 15 events of 4 hours each to balance the load, or any other such combination of events and hours to stay within the 15 events, 60 hours limitations for each customer.

In this example, assume that based on load forecasting in step 82, it was determined that for a time from 3 pm to 5 pm of the day, the load on phase A of the distribution system will be 275 MVA, load on phase B will be 300 MVA and load on phase C will be 325 MVA. Further, in step 86, the available DR events were found to be 100 MVA load capacity on each phase from 3 pm to 5 pm. Thus, in one embodiment, in step 90, 25 MVA of load out of the available load capacity for DR events on phase B will be utilized and 50 MVA of load from phase C will be utilized. This type of DR then ensures that on each phase the load is balanced equal to 275 MVA and thus, the 3 phase voltages are also balanced. However, in many cases there may not be sufficient DR events available to achieve 100% voltage balancing. So in step 88, an optimized DR event is identified from the available DR events to minimize the voltage unbalance determined in step 84. The DR events optimization calculations are done for all the time steps for the period of interest. Examples of optimization calculations techniques include a dynamic programming, an evolutionary programming, neutral network and fuzzy systems, a heuristic technique, a genetic algorithm, and interior point methods. Accordingly, in step 90, the optimized DR events are allotted for each time step during the period of interest. In step 92, the DR events history is recorded. Step 92 helps in ensuring that the same DR event is not utilized again and again. Time-to-time variations in weather and other distribution system parameter factors will also change the optimized DR event. Thus, the steps 82 to 92 are repeated over a period of time. The period may be 10 minutes, half an hour, or any other time as determined by the operator.

Figure 4:
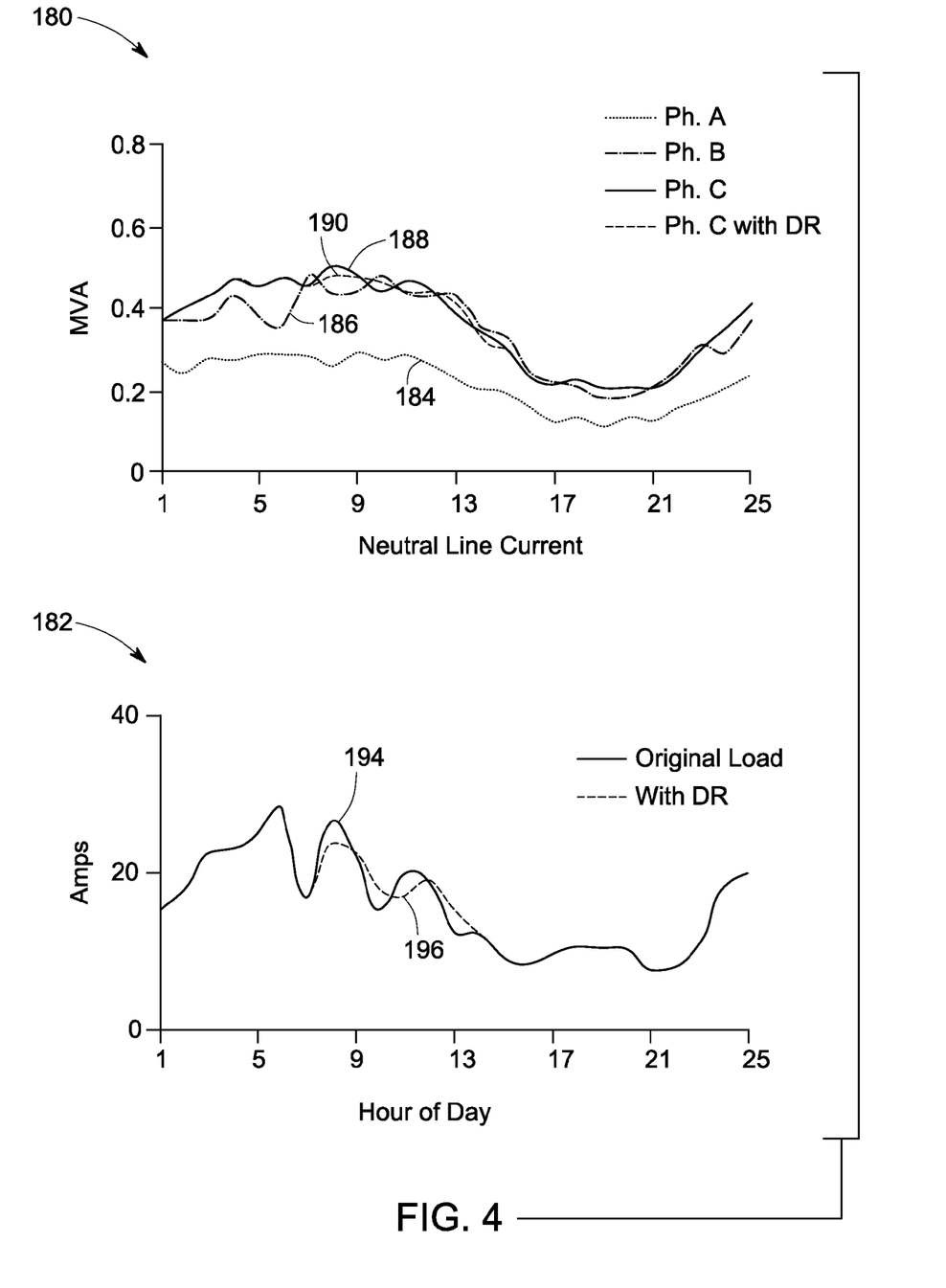
FIG. 4 is a graphical representation of MVA loading of a three phase feeder and a neutral line current of the three phase feeder.

FIG. 4 shows two graphs 180 and 182 of MVA loading of a real utility system comprising of three phases and a neutral line. Graph 180 represents three unbalanced MVA plots, plot 184 for phase A, plot 186 for phase B, and plot 188 for phase C. Graph 182 represents neutral line current plot 194 for the unbalanced three phase loading. Graph 180 also represents a phase C MVA loading plot 190 shown by a dotted line when the three phase feeder is balanced in accordance with an embodiment of the present invention. The DR event is invoked two times (each for a consecutive 2 hour period) to shift 10% of the load in the present hour to the next. The DR event helps to reduce the instantaneous power consumption on this heavily loaded phase and thus reduces the unbalance/difference between phases. The corresponding neutral line current 196 is shown in graph 182. It can be seen from the two neutral line current plots 194 and 196 that the decrease in current square ($I^2$) in a balanced case 196 is about 1.1% of an unbalanced case 194. Since the power losses in the neutral line are given by $I^2*R$, where R is the neutral line resistance, the power losses in the neutral line also reduce by 1.1% in case of the balanced case as compared to the unbalanced case. In one embodiment, as discussed earlier, this loss reduction is obtained by shifting a percentage of single phase load from one duration of the day to another duration of the day.

Figure 5:
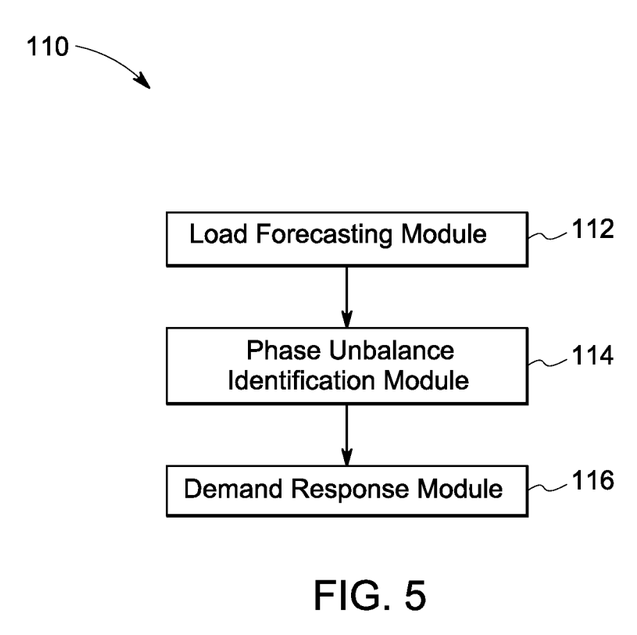
FIG. 5 is a diagrammatical representation of a phase balancing system for a power distribution system in accordance with an embodiment of the present invention

FIG. 5 shows a phase balancing system 110 for a power distribution system in accordance with an exemplary embodiment of the present invention. Phase balancing system 110 includes a load forecasting module 112, a phase unbalance identification module 114, and a demand response module 116. As described earlier load forecasting module 116 determines a load forecast for the distribution system for a period of interest of the operator and thus helps in planning the load balancing steps. Load forecasting module 116 may include various algorithms such as regression models, time series, neural networks, expert systems, fuzzy logic, and statistical learning algorithms for example.

Based on the load forecast identified in load forecasting module 112, phase unbalance identification module 114 determines a phase unbalance on the distribution system for the period of interest. Phase unbalance identification module 114 applies a load flow algorithm on the forecasted load data, identifies voltages at various nodes in the distribution system and thus determines voltage unbalance. The load flow algorithms may include William Kersting's backward/forward sweep algorithm. Demand response module 116 estimates demand response resources/events available in the distribution system for each time step of the period of interest and then utilizes available demand response events to minimize the voltage unbalance. Demand response module 116 includes demand response programs such as critical peak pricing (CPP), Variable Peak Pricing (VPP), Direct Load Control (DLC), and other various incentive programs.

As will be appreciated by those of ordinary skill in the art and as described earlier, the foregoing example or part of foregoing example and method steps may be implemented by suitable computer program code on a processor-based system, such as a general-purpose or special-purpose computer. It should also be noted that different implementations of the present invention may perform some or all of the steps described herein in different orders or substantially concurrently, that is, in parallel. The computer program code, as will be appreciated by those of ordinary skill in the art, may be stored or adapted for storage on one or more tangible, machine readable media, such as on memory chips, local or remote hard disks, optical disks (that is, CD's or DVD's), or other media, which may be accessed by a processor-based system to execute the stored code. Note that the tangible media may comprise paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A phase balancing system for a distribution system comprising:
   a load forecasting module including a combination of software and hardware elements for determining a load forecast for the distribution system for a period of interest;
   a phase unbalance identification module including a combination of software and hardware elements for determining voltage unbalance on the distribution system for the period of interest based on the load forecast;
   a demand response module including a combination of software and hardware elements for receiving the voltage unbalance from the phase unbalance identification module and for estimating an available demand response on the distribution system for the period of interest;
   wherein the demand response module is further configured for allocating an optimized demand response from the available demand response and controlling loads in the distribution system to minimize the voltage unbalance on the distribution system for the period of interest.

2. The phase balancing system of claim 1, wherein the load forecasting module comprises at least one of a regression algorithm, a time series algorithm, a neutral network algorithm, a fuzzy logic algorithm or a statistical learning algorithm.

3. The phase balancing system of claim 2, wherein the load forecast is determined based on time, weather conditions, customer types, distribution system conditions and historical data.

4. The phase balancing system of claim 3, wherein distribution system conditions include topology of the distribution system, location of customers along the network, and information on control devices.

5. The phase balancing system of claim 4, wherein information on control devices includes information on voltage regulators and capacitor banks.

6. The phase balancing system of claim 1, wherein phase unbalance identification module comprises a load flow algorithm to determine voltage information at various nodes in the distribution system.

7. The phase balancing system of claim 6, wherein the voltage information comprises a voltage angle and a voltage magnitude information.

8. The phase balancing system of claim 6, wherein the load flow algorithm comprises a William Kersting's backward/forward sweep algorithm.

9. The phase balancing system of claim 1, wherein the demand response module comprises a critical peak pricing (CPP) program, a variable peak pricing (VPP) program or a direct load control (DLC) program.

10. The phase balancing system of claim 1, wherein the period of interest comprises a number of time steps.

11. The phase balancing system of claim 1, wherein the period of interest comprises an hour, a day or a week.

12. The phase balancing system of claim 1, wherein allocating an optimized demand response comprises utilizing one of a dynamic programming, an evolutionary programming, a neutral network and fuzzy system, a heuristic technique, a genetic algorithm, or an interior point method to identify the optimized demand response.

13. A method for phase balancing in a distribution system comprising:
   determining a load forecast for the distribution system for a period of interest;

determining a voltage unbalance on the distribution system for the period of interest based on the load forecast;

estimating an available demand response on the distribution system for the period of interest; and allocating an optimized demand response from the available demand response and controlling loads in the distribution system to minimize the determined voltage unbalance on the distribution system.

14. The method of claim 13, wherein the load forecast is determined based on time, weather conditions, customer types, distribution system conditions and historical data.

15. The method of claim 13, wherein determining the voltage unbalance comprises determining voltage information on each of the node in the distribution system by applying a load flow algorithm on the load forecast.

16. The method of claim 15, wherein the voltage information comprises a voltage angle and a voltage magnitude information.

17. The method of claim 15, wherein the load flow algorithm comprises a William Kersting's backward/forward sweep algorithm.

18. The method of claim 13, wherein determining the available demand response comprises utilizing at least one of a critical peak pricing (CPP) program, a variable peak pricing (VPP) program or a direct load control (DLC) program.

19. The method of claim 13, wherein allocating an optimized demand response comprises utilizing one of a dynamic programming, an evolutionary programming, a neutral network and fuzzy system, a genetic algorithm, or an interior point method to identify the optimized demand response.

20. A non-transitory computer-readable medium comprising computer-readable instructions of a computer program that, when executed by a processor, cause the processor to perform a method for phase balancing in a distribution system comprising: determining a load forecast for the distribution system for a period of interest; determining a voltage unbalance on the distribution system for the period of interest based on the load forecast; estimating an available demand response on the distribution system for the period of interest; and allocating an optimized demand response from the available demand response and controlling loads in the distribution system to minimize the determined voltage unbalance on the distribution system.

21. The non-transitory computer-readable medium of claim 20, wherein load forecast is determined based on time, weather conditions, customer types, distribution system conditions and historical data.

22. The non-transitory computer-readable medium of claim 20, wherein determining the voltage unbalance comprises determining voltage information on each of the node in the distribution system by applying a load flow algorithm on the load forecast.

23. The non-transitory computer-readable medium of claim 22, wherein the voltage information comprises a voltage angle and a voltage magnitude information.

24. The non-transitory computer-readable medium of claim 22, wherein the load flow algorithm comprises a William Kersting's backward/forward sweep algorithm.

25. The non-transitory computer-readable medium of claim 20, wherein determining the available demand response comprises utilizing at least one of a critical peak pricing (CPP) program, a variable peak pricing (VPP) program or a direct load control (DLC) program.

* * * * *